(12) United States Patent
Eschlbeck et al.

(10) Patent No.: US 8,096,404 B2
(45) Date of Patent: Jan. 17, 2012

(54) APPARATUS AND METHOD FOR RESORTING PIECE GOODS ASSORTMENTS

(75) Inventors: Richard Eschlbeck, Vogtareuth (DE); Wolfgang Huber, Grafing (DE)

(73) Assignee: Krones AG (DE)

( * ) Notice: Subject to any disclaimer, the term of this patent is extended or adjusted under 35 U.S.C. 154(b) by 226 days.

(21) Appl. No.: 12/423,648

(22) Filed: Apr. 14, 2009

(65) Prior Publication Data
US 2009/0266676 A1  Oct. 29, 2009

(30) Foreign Application Priority Data

Apr. 24, 2008 (DE) .................. 10 2008 020 622

(51) Int. Cl.
*B65G 25/00* (2006.01)
(52) U.S. Cl. .................. 198/429; 198/427; 198/443
(58) Field of Classification Search ............... 198/419.2, 198/427, 429, 443, 431; 414/728, 729
See application file for complete search history.

(56) References Cited

U.S. PATENT DOCUMENTS

| | | | | |
|---|---|---|---|---|
| 3,534,872 A * | 10/1970 | Roth et al. | ...................... | 198/443 |
| 3,809,254 A | 5/1974 | Leach | ................................ | 214/6 |
| 6,290,448 B1 | 9/2001 | Focke et al. | .............. | 414/222.01 |
| 6,572,326 B2 * | 6/2003 | Myers et al. | ................... | 198/429 |
| 6,726,001 B2 * | 4/2004 | Wild et al. | .................... | 198/433 |
| 6,892,890 B2 | 5/2005 | Dominguez | .................. | 209/559 |
| 7,784,599 B2 * | 8/2010 | Balleza et al. | ................. | 198/432 |
| 7,896,151 B2 * | 3/2011 | Meisinger | ................... | 198/419.2 |
| 2005/0246056 A1 | 11/2005 | Marks et al. | ................... | 700/213 |
| 2006/0133917 A1 | 6/2006 | Clark et al. | ..................... | 414/729 |
| 2007/0280814 A1 | 12/2007 | Morency et al. | .............. | 414/788 |

FOREIGN PATENT DOCUMENTS

| | | |
|---|---|---|
| EP | 0 213 305 | 3/1987 |
| EP | 1 046 598 | 10/2000 |
| EP | 1 456 101 | 12/2003 |
| WO | WO 2004/039705 | 5/2004 |

OTHER PUBLICATIONS

German Search Report dated Apr. 24, 2008.

* cited by examiner

*Primary Examiner* — James R Bidwell
(74) *Attorney, Agent, or Firm* — Hayes Soloway P.C.

(57) ABSTRACT

An apparatus for resorting piece goods assortments comprises a supply device, which transports along a first predefined transport path a piece goods assortment containing a plurality of piece goods arranged in predefined geometric positions, and at least one redistribution unit arranged at least partially downstream of the supply device along the transport path of the piece goods assortment. The redistribution unit comprises at least one pick-up element for picking up an individual item of piece goods of the piece goods assortment or a group of piece goods of the piece goods assortment, and a discharge device which is arranged downstream of the redistribution unit along the transport path. The pick-up element of the redistribution unit is movable in at least two different directions. The pick-up element removes individual piece goods or groups of piece goods from the piece goods assortment and transfers said piece goods to the discharge device.

20 Claims, 2 Drawing Sheets

APPARATUS AND METHOD FOR RESORTING PIECE GOODS ASSORTMENTS

BACKGROUND OF THE INVENTION

The present invention relates to an apparatus and a method for resorting piece goods assortments. The invention will be described with reference to assortments of packaging units and in particular of packaging units for beverage containers. It is also pointed out that the scope of application of the present invention is not limited to such packaging units. Various apparatuses for transporting and sorting or palletising packaging units are known from the prior art. For instance, WO 2004/039705 A1 describes a method and an apparatus for arranging and orienting packages. Therein, packages are supplied and combined into a predefined assortment.

EP 1 046 598 A1 describes an apparatus for making palletisable layers of packaging units. In this apparatus, too, rows of packaging units are supplied and are combined to form regular packaging unit assortments.

EP 213 305 describes an apparatus for unloading and loading pallets. In this apparatus, firstly pallets holding packaging units are unloaded, then rows of packaging units are supplied to a plurality of storage modules and are redistributed with the aid of these storage modules, which are arranged parallel to one another, so that the assortment on the pallets can be changed. However, as mentioned, it is necessary in this procedure to provide a plurality of storage units arranged parallel to one another, among which the packaging units are firstly distributed in order subsequently to be able to be rearranged in a different assortment.

SUMMARY OF THE INVENTION

The object of the present invention is therefore to provide an apparatus and a method which allow a resorting of piece goods assortments in a particularly advantageous manner. A resorting of piece goods assortments will be understood to mean in particular a removal of these piece goods assortments from pallets. However, a resorting will also be understood to mean a changing of the arrangement of individual piece goods, such as in particular, but not exclusively, a so-called order picking in which packaging units of different types are brought together.

An apparatus according to the invention for resorting piece goods assortments and in particular packaging unit assortments for beverages comprises a supply device which transports along a first predefined transport path a piece goods assortment containing a plurality of piece goods arranged in predefined geometric positions. Also provided is at least one redistribution unit which is arranged along this transport path of the piece goods assortment, wherein the redistribution unit comprises at least one pick-up element for picking up an individual item of piece goods of the piece goods assortment or a group of piece goods of the piece goods assortment, and a discharge device which is arranged downstream of the redistribution unit along the transport path, wherein the pick-up element of the redistribution unit is movable in at least two different directions.

According to the invention, the at least one pick-up element is configured in such a way that it removes individual piece goods or groups of piece goods from the piece goods assortment and transfers said piece goods preferably directly to the discharge device. Preferably, the redistribution unit is arranged at least partially downstream of the first supply device.

Preferably, both the supply device and the discharge device are in each case transport devices which transport the piece goods assortment or the piece goods. Preferably, the transport direction in which the supply device transports the piece goods and the transport direction in which the discharge device transports the piece goods are the same. In this way, a particularly efficient redistribution of the piece goods is achieved.

A redistribution unit will be understood to mean a unit which changes or redistributes a geometric arrangement of the piece goods. For instance, it is possible that the redistribution unit forms from a layer of piece goods one row of piece goods arranged one behind the other. Conversely, rows of piece goods may also be converted to layers. Preferably, the apparatus comprises an unloader which transfers packaging unit layers or piece goods assortments, layer by layer, to the supply device, which is preferably designed as a transport table.

In this case, this unloader may comprise elements such as clamps, but it is also possible that the piece goods assortment is transferred to the supply device by means of suction or displacement or by gripping with hooks. This supply device then moves the piece goods assortment, still in a closed formation or an essentially closed formation, below the redistribution unit.

In one preferred embodiment, the apparatus comprises a distance creation unit which is preferably arranged at least partially upstream of the redistribution unit and which creates distances between the individual piece goods in a transport direction of the piece goods assortment. By virtue of these distances created between the piece goods or between groups of piece goods, it is possible for the pick-up elements of the redistribution unit to grip these individual piece goods or groups.

The pick-up elements preferably have gripping elements which comprise for example two plates which are located opposite one another and between which the individual piece goods or a group of piece goods can be picked up. These pick-up elements then displace the piece goods in question relative to the respective transport device, such as for example the supply device or the distance creation unit.

Preferably, the distance creation unit comprises a transport device which conveys the piece goods in the same transport direction as the supply device but at a higher transport speed than the supply device. In this way, due to the higher speed of this transport device, distances are created between the individual piece goods in the transport direction. In other words, gaps for breaking up the piece goods assortment are already formed by the differences in speed between a transport table on which the layer is first deposited, i.e. the supply unit, and the further transport unit or the distance creation unit, which is likewise designed as a transport table and which is preferably arranged at least partially below the redistribution unit, wherein these gaps allow the pick-up elements of the redistribution unit to engage more precisely.

In a further advantageous embodiment, at least one transport unit is a transport belt and it is pointed out in this connection that both the supply device and also the discharge units preferably are transport belts or comprise transport belts. However, a plurality of transport belts could also be provided one behind the other below the redistribution unit.

In a further advantageous embodiment, at least two transport belts have different coefficients of friction in relation to the packaging units to be transported. With particular preference, the transport belt of the supply device has a different coefficient of friction than the transport belt of the distance creation unit. By virtue of these different friction values of the two transport units or transport tables, distances between the piece goods or packaging units can be created in a particularly advantageous manner.

Preferably, the apparatus comprises a detection device which detects the position of individual piece goods within a piece goods assortment. However, it would also be possible that certain layer patterns of the piece goods are already known beforehand. Via the defined layer pattern known or recognised for the pallet to be unloaded and/or at the unloader, the pick-up element of the redistribution unit transfers individual packaging units or groups of packaging units.

These individual packaging units or groups of packaging units can be transferred via a mechanical clamp system, a suction system, a hook system or the like. The groups of packaging units are preferably a plurality of packaging units located in a certain arrangement relative to one another. The redistribution unit breaks up these packaging units or groups of packaging units from the layer structure, so that they can enter the discharge device or a packaging unit buffer transport system.

The pick-up element of the redistribution unit displaces the packaging units and removes the packaging unit from the layer structure by means of a preferably linear movement working in a plurality of axes and/or also by rotation, and transfers said packaging unit onto a further transport belt which is directly connected to the discharge unit. It would also be possible for the pick-up element to displace the packaging unit merely relative to a transport device, such as for example the transport belt of the distance creation unit. In this way, the piece goods assortment is successively broken up.

Preferably, the pick-up element can be moved in a plurality of directions which are independent of one another, and can also be raised or lowered relative to a plane of the transport device and optionally additionally rotated. It would also be possible to arrange two or more redistribution units preferably directly one behind the other in the transport direction of the piece goods.

In a further advantageous embodiment, the apparatus comprises a further discharge device which is arranged next to the first discharge device. In this way the piece goods, optionally of different types, which have now been broken up can be transported away parallel to one another.

After breaking up a first piece goods assortment or packaging unit layer, an identical or different type of packaging unit with a new or the same layer pattern can then be supplied to the redistribution unit, and the break-up of this new piece goods assortment takes place in a similar manner, wherein this also depends on the arrangement of the individual packaging units within the piece goods assortment. If for example a new type of packaging unit has been unloaded, the packaging units thus separated are preferably guided into the further discharge device.

Preferably, the apparatus comprises a second redistribution unit which is arranged downstream of the discharge device, wherein this second redistribution unit comprises a pick-up element which is movable in at least two different directions. By means of this second redistribution unit, preferably an order picking of the packaging units can be achieved.

As mentioned above, the arrangement of the individual packaging units within the piece goods assortment should necessarily be known to the unloader. The position of the individual packaging units may, as mentioned, also be detected via cameras or similar optical detection systems in the supply device of the unloaded layer or within the redistribution unit.

Preferably, at least one transport device runs partially below the redistribution unit. This means that the piece goods also move independently of a pick-up or gripping process. It would thus be possible that individual piece goods are not gripped but rather run directly from the supply device into the discharge device without any interaction of the redistribution unit.

In a further advantageous embodiment, the apparatus comprises a pallet conveyor unit for transporting pallets. It is thus possible for the pallets emptied in this way to be reused, in order to arrange the resorted packaging units thereon. In this case, the pallets are preferably transported in the same direction as the piece goods or packaging units.

The present invention also relates to an apparatus for resorting piece goods assortments, wherein this apparatus comprises a first supply device for a first type of piece goods and also a second supply device for supplying a second type of piece goods, wherein the first type of piece goods and the second type of piece goods are different and are in each case supplied to a first redistribution unit. This redistribution unit comprises a pick-up element which can grip individual piece goods or groups of piece goods and can transfer them to a further transport unit. In this case, the redistribution unit or the pick-up element thereof is configured in such a way that it is able to pick up respectively both piece goods of the first type and also piece goods of the second type and transfer them to the further transport device. Here too, a transport belt on which the piece goods are transported is preferably arranged below the redistribution unit.

In this way, the redistribution unit can also be used to create mixed pallets or mixed layer patterns or can be used for order picking. The redistribution unit is supplied by a certain number of transporters or supply devices, each containing packaging units of a single type.

The packaging units are fed onto and output from a transport device or a grouping table of the redistribution unit in sequence via palleting schemes which can be freely selected by the customer or which have already been predefined via fixed programs. Here, it is possible for the pick-up elements of the redistribution unit to produce the desired layer patterns. In this way, constantly identical and also alternating layer patterns or piece goods assortments can be produced.

It is not absolutely necessary in this case for the size, i.e. the length, width and height of the packaging units or even the type of packaging units (cardboard box, plastic crate, shrink-wrapped packaging unit, etc.) to be the same within one layer.

The groups of packaging units or else individual packaging units can be conveyed (depending on the requirement of the layer pattern) via the pick-up elements of the redistribution unit. As a result, the packaging units or groups of packaging units are preferably displaced in a linear x,y direction and/or simultaneously rotated. It would also be possible for individual packaging units to be arranged one above the other or drawn over one another by lifting the packaging units.

The present invention also relates to a method for resorting piece goods assortments and in particular packaging unit assortments. In a first step, a piece goods assortment containing a plurality of piece goods arranged in predefined geometric positions is supplied by means of a supply device along a first transport path to a first redistribution unit. In a further method step, individual piece goods or groups of piece goods are picked up by means of a pick-up element of the redistribution unit. In a further step, the individual piece goods or groups of piece goods are transferred to a discharge unit, wherein at least some of the piece goods are moved in at least two directions which are different from one another between pick-up by the pick-up element and transfer to the discharge unit. Finally, the piece goods are transported away by means of the discharge unit.

Preferably, the piece goods are transported away one behind the other in a transport direction.

In one preferred method, the individual piece goods are transferred to at least two discharge units arranged next to one another. In this way, it is possible in particular to convey different types of piece goods separately.

In a further preferred method, the piece goods are transported one behind the other in one row on at least one discharge unit.

Preferably, distances are formed between the individual piece goods prior to pick-up by the pick-up element. In this case, preferably the packaging units are transported by a first transport device at a slower speed and by a subsequent transport device at a higher speed.

In a further preferred method, the piece goods are transported in the same transport direction by the supply device and the discharge unit.

The present invention also relates to a method for resorting piece goods assortments and in particular packaging unit assortments, wherein, in a first step, a first type of piece goods is supplied to a redistribution unit. In a further step, a second type of piece goods, which is different from the first type, is supplied to the redistribution unit. In a further step, individual piece goods or groups of piece goods are picked up by means of a pick-up element of the redistribution unit, wherein according to the invention the pick-up element picks up both piece goods of the first type and also piece goods of the second type and deposits these piece goods onto a support in such a way that a piece goods assortment consisting of piece goods of the first type and piece goods of the second type is formed.

In this case, the piece goods assortment is formed according to a predefined pattern. Preferably, this pattern is predefined by a control device or can also be freely selected by the machine operator.

Preferably, at least one type of piece goods is supplied to the redistribution unit by a discharge unit as described above. In this way it is possible overall to permit a method in which firstly a piece goods assortment is unloaded from a pallet and then piece goods thus separated are combined again to form desired assortments. This may be of interest in particular when assortments of one specific type are to be separated and assortments containing a plurality of types of different beverages are to be formed.

BRIEF DESCRIPTION OF THE DRAWINGS

Further advantages and embodiments will emerge from the appended drawings.

In the drawings.

DETAILED DESCRIPTION OF THE INVENTION

Figure 1:
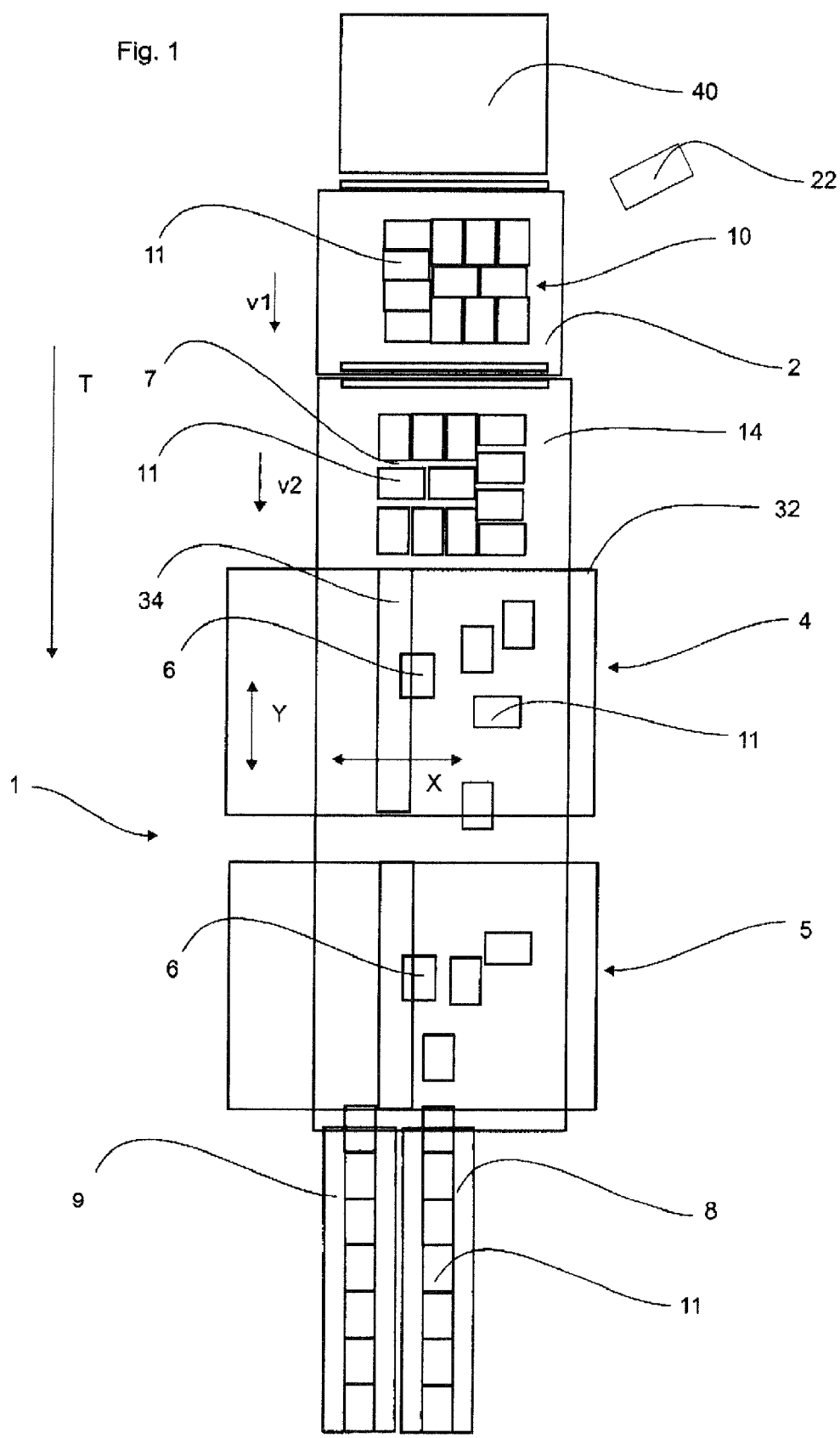
FIG. 1 shows a schematic view of an apparatus according to the invention.

FIG. 1 shows a schematic view of an apparatus 1 according to the invention. This apparatus comprises a first loading device 40 (shown only very schematically), by means of which piece goods assortments 10 are transferred onto a supply device 2. This loading device 40 may comprise for example pushing elements or gripping elements which transfer the piece goods assortment 10 onto the supply device 2. The piece goods assortment 10 is composed of a plurality of piece goods 11, here in the form of packaging units. Some of these packaging units 11 are oriented horizontally, and some are oriented vertically.

This supply device 2 transports the piece goods assortment 10 at a first speed v1, namely in the direction of the transport path T, i.e. in the direction of a distance creation unit 14. This distance creation unit 14 is a second transport belt which conveys the piece goods 11 at a higher speed v2 than the supply device 2. In this way, gaps 7 can be created between the individual piece goods 11 in the transport direction T, by means of which gaps the piece goods 11 can be gripped.

The distance creation unit or transport device 14 also extends below a first redistribution unit 4 and a second redistribution unit 5. This redistribution unit 4 comprises a pick-up element 6 which is movable both in the x-direction and also in the y-direction. Preferably, this pick-up element is also movable in the z-direction, i.e. perpendicular to the plane of the figure here, in order to lift the piece goods 11. It is thus possible both for the piece goods to be lifted and displaced and also for them to be displaced relative to the transport device 14. Reference 34 denotes an arm, on which the pick-up element 6 is arranged.

Figure 2:
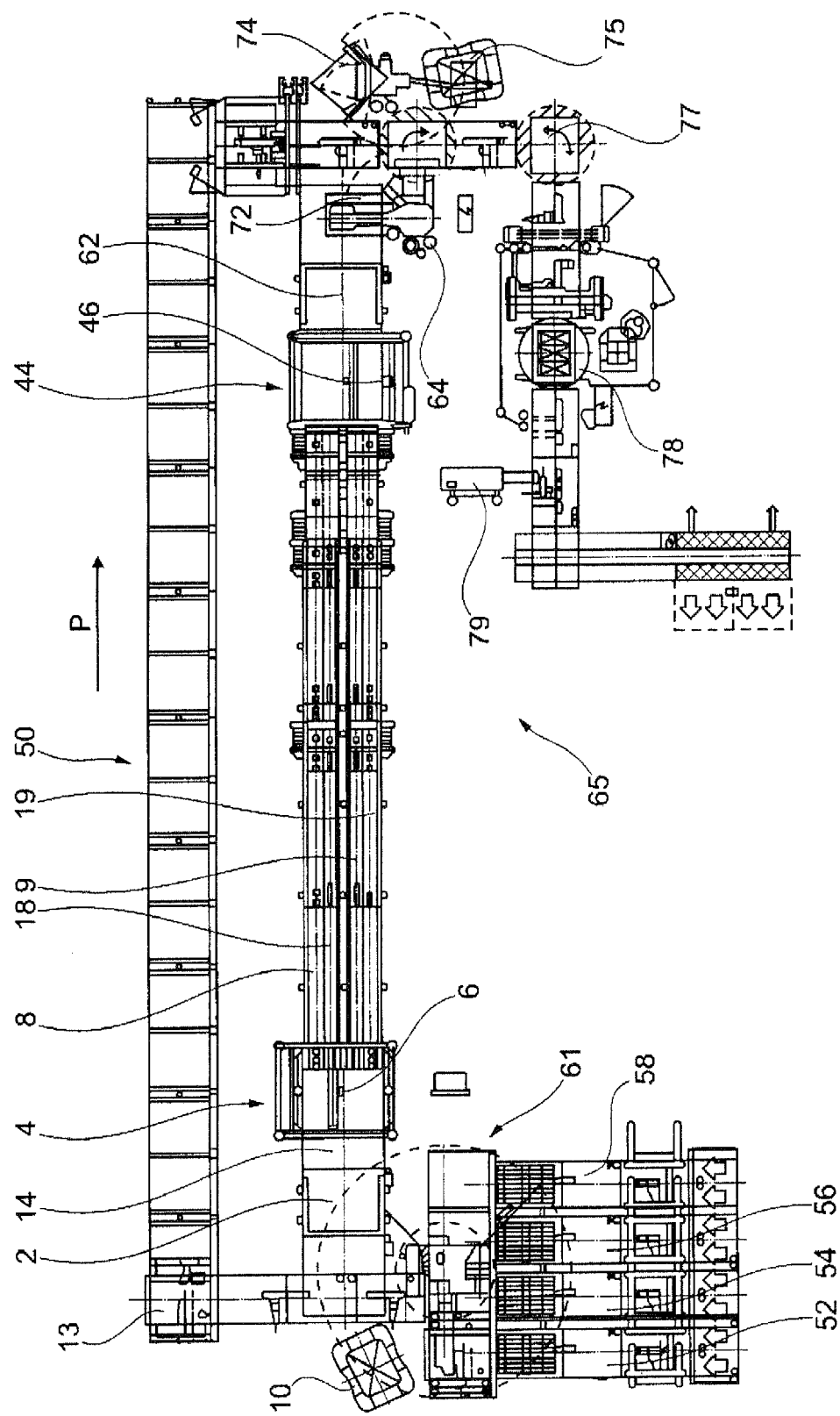
FIG. 2 shows a schematic view of an installation according to the invention comprising the apparatus of FIG. 1.

In addition, the pick-up element 6 is configured in such a way that it can also rotate about an axis which is perpendicular to the plane of the figure in FIG. 2. In this way it is possible also to rotate individual piece goods through for example 90°. In the apparatus shown in FIG. 1, two redistribution units 4, 5 are arranged one behind the other, but these are adapted to one another in such a way that all the piece goods can be rotated and displaced into the correct position in a particularly efficient manner. By means of the two redistribution units 4, 5, the piece goods are finally displaced on the transport device 4 in such a way that they can be discharged, during the further movement of the transport device 14, directly into a discharge device 8 in which they are conveyed in a row.

As soon as the process is ended, the apparatus can be loaded with a further piece goods assortment and the process can be repeated. If this second piece goods assortment comprises a plurality of packaging units of a different type, the two redistribution units may also be configured in such a way that all the piece goods 11 are transferred into the second discharge device 9. Reference 22 denotes an image capture device for observing the piece goods assortments or the geometric arrangement of the individual piece goods.

FIG. 2 shows a view of an installation 65 comprising the apparatus 1 shown in FIG. 1. In this case, the apparatus 1 can be supplied with four different types of packaging units by means of loading devices 52, 54, 56, 58. More specifically, a transfer unit 61 is provided which can selectively pick up packaging unit assortments 10 from each of the loading devices 52, 54, 56, 58 and can transfer them to the supply device 2. In this case, said transfer unit may be a transport device which conveys the packaging units on a circular path indicated by the circle k.

The respective pallets 13, which are located below the piece goods assortments, are transferred to a pallet conveyor 50 which conveys the empty pallets likewise from left to right in FIG. 2. The apparatus according to the invention now causes the piece goods assortments to be broken up and, depending on the type of packaging unit, transferred to one of the four discharge devices 8, 9, 18, 19. By means of these discharge devices, which can also be referred to as packaging unit buffer transport systems, the packaging units are conveyed from left to right in the direction of the arrow P.

Reference 44 denotes a further redistribution unit with a pick-up element 46, although the latter serves here to recompile piece goods assortments from the packaging units 11 arriving in the four discharge devices 8, 9, 18 and 19. In this case, piece goods assortments (not shown) are once again produced which are then transported away by means of a discharge belt 62. Reference 64 denotes a further transfer unit which places the piece goods assortments on the pallets which have been transported here in the meantime. Reference 74 denotes a supply device for intermediate layers 75, wherein these intermediate layers are deposited in each case between individual layers of piece goods assortments. Via a corner conveyor 77, the layers of piece goods assortments which have now been fully compiled and also the intermediate layers are conveyed to a packing unit 78, in which they are packed. An inspection unit 79 checks the correct packing state of the now fully loaded and bound pallets.

Reference 65 denotes the entire installation for order picking, and reference 72 denotes a transport device for the piece goods assortments.

All of the features disclosed in the application documents are claimed as essential to the invention in so far as they are novel individually or in combination with respect to the prior art.

LIST OF REFERENCES

1 apparatus
2 supply device
4, 5, 44 redistribution unit
7 gaps
6, 46 pick-up element
8, 9 discharge device
10 piece goods assortment
11 piece goods
13 pallets
14 distance creation unit
34 arm or carrier
40 loading device
50 pallet conveyor
52, 54, 56, 58 loading devices
65 installation
61 transfer unit
62 discharge belt
74 supply device
75 intermediate layers
77 corner conveyor
78 packing unit
79 inspection unit
k circular path
T transport path
P arrow
V1, V2 speed
X, Y direction
P arrow

The invention claimed is:

1. Apparatus for resorting piece goods assortments and in particular packaging unit assortments, comprising:
    a supply device which transports along a first predefined transport path a piece goods assortment containing a plurality of piece goods arranged in predefined geometric positions; and
    at least one redistribution unit arranged along the transport path (T) of the piece goods assortment, wherein the redistribution unit comprises at least one pick-up element for picking up an individual item of piece goods of the piece goods assortment or a group of piece goods of the piece goods assortment, and a discharge device which is arranged downstream of the redistribution unit along the transport path (T), wherein the pick-up element of the redistribution unit is movable in at least two different directions (X, Y) which are independent from each other, wherein said at least two different directions (X,Y) are in a plane of movement of the piece goods, wherein the at least one pick-up element is configured in such a way that it removes individual piece goods or groups of piece goods from the piece goods assortment and transfers said piece goods to the discharge device.

2. Apparatus according to claim 1, wherein the apparatus comprises a distance creation unit which creates distances between individual piece goods in a transport direction (T) of the piece goods assortment.

3. Apparatus according to claim 2, wherein the distance creation unit comprises a transport device which conveys the piece goods in the same transport direction (T) as the supply device but at a higher transport speed than the supply device.

4. Apparatus according to claim 1, wherein at least one transport device is a transport belt.

5. Apparatus according to claim 4, wherein at least two transport belts have different coefficients of friction in relation to the piece goods to be transported.

6. Apparatus according to claim 1, wherein the apparatus comprises a detection device which detects the position of individual piece goods within a piece goods assortment.

7. Apparatus according to claim 1, wherein the apparatus comprises a further discharge device which is arranged next to the first discharge device so that piece goods can be transported parallel to one another.

8. Apparatus according to claim 1, wherein the apparatus comprises a second redistribution unit which is arranged downstream of the discharge device, wherein this second redistribution unit comprises a pick-up element which is movable in at least two different directions.

9. Apparatus according to claim 1, wherein at least one transport device runs partially below the redistribution unit.

10. Apparatus according to claim 1, wherein the apparatus comprises a pallet conveyor unit for transporting pallets.

11. Apparatus according to claim 8, wherein the two directions in which the pick-up element of the second redistribution unit is movable extend in the plane of movement of the piece goods.

12. Apparatus according to claim 1, wherein the pick-up element is further movable in a third direction (Z), which is perpendicular to the plane of movement of the piece goods.

13. Apparatus according to claim 1, wherein the pick-up element is rotatable about an axis which is perpendicular to the plane of movement of the piece goods.

14. Method for resorting piece goods assortments and in particular packaging unit assortments, comprising the steps:
    supplying a piece goods assortment, containing a plurality of piece goods arranged in predefined geometric positions, using a supply device along a first transport path (T) to a first redistribution unit;
    picking up individual piece goods or groups of piece goods using a pick-up element of the redistribution unit;
    transferring the individual piece goods or groups of piece goods to a discharge unit, wherein at least some of the piece goods are moved in at least two directions (X,Y), which extend in a plane of movement of the piece goods and which are independent from one another, between pick-up by the pick-up element and transfer to the discharge unit; and transporting the piece goods using the discharge unit.

15. Method according to claim 14, wherein the individual piece goods are transferred to at least two discharge units arranged next to one another.

16. Method according to claim 14, wherein the piece goods are transported one behind the other in one row on at least one discharge unit.

17. Method according to claim 14, wherein the piece goods are transported in the same transport direction (T) by the supply device and the discharge unit.

18. Method according to claim 14, wherein the redistribution unit forms from a layer of piece goods a row of piece goods arranged one behind the other.

19. Method for resorting piece goods assortments and in particular packaging unit assortments using the apparatus according to claim 1, comprising the steps:

supplying a first type of piece goods to a redistribution unit;

supplying a second type of piece goods, which is different from the first type, to the redistribution unit;

picking up individual piece goods or groups of piece goods using a pick-up element of the redistribution unit;

wherein the pick-up element picks up both piece goods of the first type and also piece goods of the second type and deposits these piece goods in such a way that a piece goods assortment consisting of piece goods of the first type and piece goods of the second type is formed.

20. Method according to claim 19, wherein the at least one type of piece goods is supplied to the redistribution unit by a discharge unit.

* * * * *